No. 768,986. PATENTED AUG. 30, 1904.
D. GORDON.
PLANTING ATTACHMENT FOR PLOWS.
APPLICATION FILED OCT. 17, 1903.
NO MODEL.

WITNESSES:
Paul Hunter

INVENTOR
Duncan Gordon
BY
ATTORNEYS.

No. 768,986. Patented August 30, 1904.

UNITED STATES PATENT OFFICE.

DUNCAN GORDON, OF DALLAS, TEXAS.

PLANTING ATTACHMENT FOR PLOWS.

SPECIFICATION forming part of Letters Patent No. 768,986, dated August 30, 1904.

Application filed October 17, 1903. Serial No. 177,375. (No model.)

*To all whom it may concern:*

Be it known that I, DUNCAN GORDON, a citizen of the United States, and a resident of Dallas, in the county of Dallas and State of Texas, have invented a new and Improved Planting Attachment for Plows, of which the following is a full, clear, and exact description.

My invention relates to a planting attachment for plows; and the purpose of the invention is to provide a beam having adjustable supporting-wheels capable of being raised and lowered to bring the driving-wheels into engagement with the ground or raise the driving-wheels from the ground and to provide means for independently raising and lowering the driving-wheels to permit the plowshare to enter the ground more or less deeply and also to provide a simple driving connection between the driving-wheels and the seed-distributing device employed for planting.

A further purpose of the invention is to provide the beam with a forward adjustable caster-wheel, so that the forward end of the beam may be adjusted relative to the ground, and to provide disks adapted to be adjusted relative to the beam, so as to throw the earth to or from the beam, and consequently in a direction to build up a row or bed as high as may be desired, or throw the earth in a reverse direction, the implement being especially adapted to prepare the ground for corn, cotton, sugar-cane, or other crops to be planted in rows, and also to provide a means whereby the disks may be adjusted to effect what is known as "flat breaking" for small grain, such as oats, wheat, &c.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
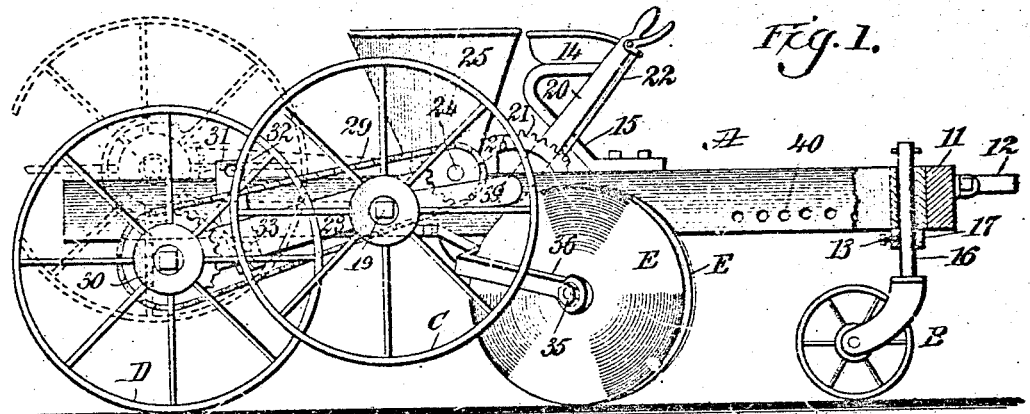
Figure 2:
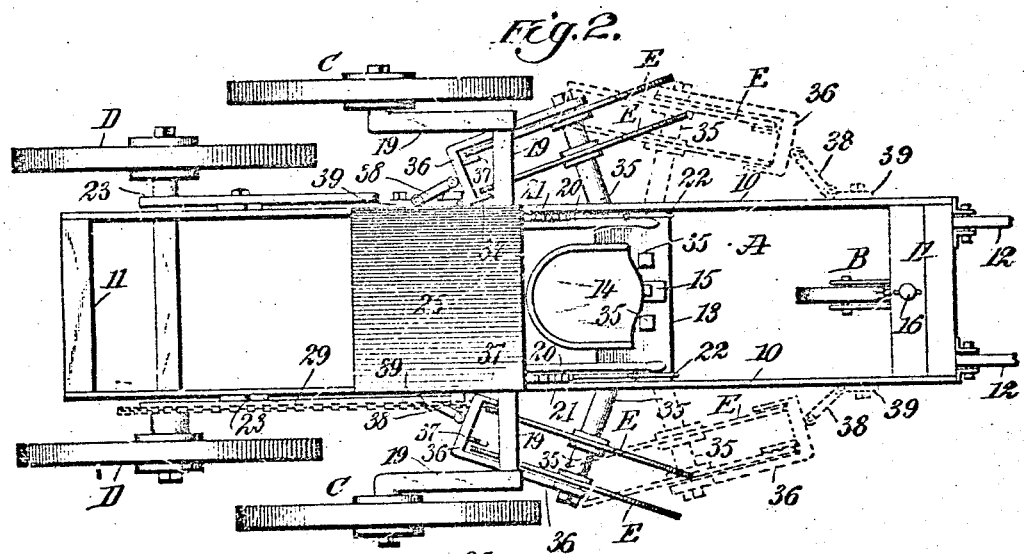
Figure 3:
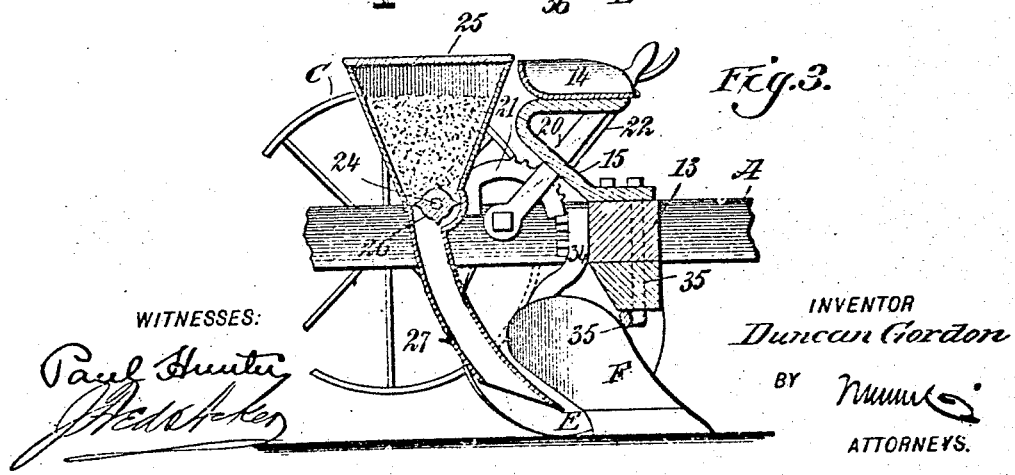

Figure 1 is a sectional side elevation of the improved implement. Fig. 2 is a plan view of the same, showing the disks in two positions; and Fig. 3 is a vertical fragmentary section through the beam and seed-dropping mechanism, illustrating the position of the plow, which appears in side elevation.

A represents the beam, which is generally constructed as illustrated, comprising parallel side pieces 10 and front and rear cross-bars 11, the shafts 12 being connected with the front cross-bar, as is shown in Figs. 1 and 2. An intermediate cross-bar 13 is also employed between the center of the beam A and the forward cross-bar 11, as is shown in Figs. 2 and 3.

The support 15 for the driver's seat 14 is attached to the intermediate cross-bar 13. The forward end of the beam A is supported by means of a caster-wheel B, the shank 16 of which is made to pass loosely upward through a suitable opening in one of the forward cross-bars 11, since two of such bars are shown; but a single cross-bar 11 may be used at the front of the beam A of sufficient width to receive the said shank 16 of the caster-wheel. The forward end of the beam A is held raised or lowered with relation to the ground preferably by placing a collar 17 on the shank 16 of the caster-wheel engaging with the lower forward portion of the said beam, as is shown in Fig. 1, which collar is held in proper position on the shank 16 by a set-screw 18 or its equivalent.

The central portion of the beam is supported by wheels C, which are brought into action when the implement is being carried to or from the field. These supporting-wheels C are mounted on independent crank-axles 19, the horizontal limbs of which axles are mounted to turn in the side pieces 10 of the beam A. Levers 20 are attached to the inner ends of the horizontal limbs of the said crank-axles 19, which levers are provided with thumb-latches 22 to engage with racks 21 carried by the beam. Thus by operating the levers 20 the supporting-wheels C may be raised from the ground or may be brought in engagement with the ground, and when they are brought in engagement with the ground the rear portion of the beam is elevated, at such time carrying from engagement with the ground the driving-wheels D, located one at each side of the rear portion of the said beam.

These driving-wheels D are mounted to turn upon arms 23, one driving-wheel being independent of the other, and the said arms are at the outer side faces of the beam and at their inner ends are pivotally attached to the side portions of a hopper 25, supported by the beam at the rear of the driver's seat 14.

The attachment of the arms 23 to the hopper 25, adapted to hold the seed, is in the immediate vicinity of a shaft 24, which is journaled in the throat portion of the said hopper, as is shown in Figs. 1 and 3, and on this shaft within the hopper a seed-distributing wheel 26 is secured, preferably of stellated form, as is shown in Fig. 3. From the throat portion of the hopper 25 a seed-delivery spout 27 is carried downward, as is also shown in Fig. 3.

At one end of the shaft 24 a small sprocket-pinion 28 is secured, and a chain belt 29 is passed over this sprocket-wheel and over a larger sprocket-wheel 30, secured to one of the driving-wheels D. The driving-wheels D are raised and lowered, so as to regulate the depth that the plowshare (to be hereinafter mentioned) shall enter the ground, and such adjustment of the share is promoted by the adjustment of the forward caster-wheel B.

The arms 23, carrying the driving-wheels D, may be held in adjusted position in any suitable or approved manner—as, for example, by securing segmental plates 31 to the outer side faces of the beam A, which plates have three apertures 32 made therein, one near each end and one at the center, and pins 33 are passed through the said arms 23 into any of the apertures 32 in the aforesaid keeper-plates 31, so that the driving-wheels D may be held in lowered or adjusted position, or in a position where their hubs will be between the top and bottom portions of the beam, or in an upper position, wherein the hubs are above the said beam, as is shown by dotted lines in Fig. 1.

A plow F of any approved type is located in front of the delivery-spout 27 for the seed box or hopper 25, as is shown in Fig. 3, and the shank 34 of this plow is attached in any approved manner, preferably to the rear edge of the intermediate cross-bar 13.

In connection with the beam I employ at each side of the beam one, two, or more disks E, which may be plain, as illustrated, or may be dished, as desired. The disks are mounted to turn loosely on angular or L-shaped shafts 35, the vertical members of which shafts are journaled in the intermediate cross-bar 13, as is indicated in Figs. 2 and 3, and are locked in adjusted position by suitable nuts, the upper ends of the vertical members of the said shafts being threaded to receive said nuts. The disks are removably held on the shaft in desired position by any approved means—as, for example, by washers or collars detachably secured to the shafts, as is indicated in Fig. 2. The outer ends of the shafts 35 are journaled in the end portions of angular horizontally-locat brackets or hangers 36, the ends of the sh being mounted to turn in the free ends of wh may be termed the "outer" members of t said brackets or hangers, and the inner me bers of the brackets or hangers, which exte in direction of the sides of the beam, ha scrapers 37 formed thereon, so placed as to move any dirt from the disks that may cli thereto.

Links 38 are connected with the inner me bers of the hangers or brackets 36, the co nection being in a pivotal manner, and th links are likewise pivotally attached to pla 39, which plates are adapted to be removal secured by bolts or equivalent means to sides of the beam A. When the implemen to be used to throw up a row or continue hill, the shafts 35 are given a rearward incli tion, as is shown in Fig. 2, and are held such position by the nuts above alluded to a by the attachment of the plates 39 to the si of the beam A, such attachment being ma between the center and the rear end of beam.

If it is desired to throw earth away from furrow made by the plow, the shafts 35 given more or less of a forward inclination is shown by dotted lines in Fig. 2, thus versing the position of the disks with ret ence to the sides of the beam, and at such ti the plates 39 are adjustably secured to the f ward portion of the beam by passing suita bolts through the said plates and through one of a series of apertures 40, made in side pieces 10 of the beam near its forw end, as is shown in Fig. 1.

It will be observed that the shafts 35 may adjusted in any manner required to throw a row or to throw earth away from a gi point or so that the earth will be pulveri when turned up by the plow and the soil s ably prepared for the reception of such s as oats, wheat, and the like.

When the implement is to be carried to from a field, the main supporting-wheels C lowered to the ground and the driving-wh D are raised to a greater or less extent, when the field is reached the main support wheels C are carried upward from the grou as shown in Fig. 1, permitting the disks to gage with the ground, as shown in Fig The depth to which the plow F shall enter ground is determined by the adjustment the rear or driving wheels D, and such reg tion of the said plowshare F may be furt made by the adjustment of the forward cas wheel B.

This implement is exceedingly simple, du ble, and economic in its construction an well adapted for the purpose intended. or more disks E may be carried by each s 35, according to the desired distance betw rows.

Having thus described my invention, I claim as new and desire to secure by Letters Patent—

1. In an agricultural implement, a beam, an adjustable caster-wheel support for the forward end of the beam, a seed-dropping mechanism carried by the beam, driving-wheels for the seed-dropping mechanism, also serving as working rear supports for the beam, main supporting-wheels for the beam, and means for raising and lowering the main supporting-wheels and locking them in adjusted position, as described.

2. In an agricultural implement, a beam, an adjustable caster-wheel support for the forward end of the beam, driving-wheels serving as working rear supports for the beam, main supporting-wheels for the beam, located between the forward and rear wheels, crank-axles for the main supporting-wheels, and adjusting devices for the crank-axles, as and for the purpose described.

3. In an agricultural implement, a beam, shafts journaled in the beam and extending at an inclination from opposite sides thereof, disks mounted to turn upon the shafts, hangers for the shafts, adjustable link connections between the hangers and the beams, supporting the said shafts at various angles to the beam and with forward or rearward inclination, as set forth.

4. In an agricultural implement, a beam, shafts journaled in the beam and extending from opposite sides thereof, disks mounted to turn on the said shafts, hangers for the outer ends of the shafts, scrapers carried by the hangers, links connected with the said hangers, and means for attaching the said links to the said beam at either side of the center thereof, to set the disks at different degrees of inclination with reference to the beam and to cause the inclination of the shafts car ing the disks to be either forward or rearw: as required and for the purpose described 5. In an agricultural implement, the co bination with a beam, an adjustable cast wheel forming a forward support for the be: crank-shafts journaled at opposite sides of beam, main supporting-wheels carried by crank-shafts, adjusting-levers for the cra shafts, and locking devices for said levers a hopper for seed, a seed-distributing me anism in said hopper, a plow carried by beam in front of the delivery portion of hopper, arms pivoted at opposite sides of beam and extending rearward therefro wheels adapted as driving and support wheels mounted to revolve at the rear p tions of the said arms, a driving connect between one of the latter wheels and the se distributing mechanism, locking devices the said arms, crank-shafts journaled in said beam near opposite sides, the horizor members whereof extend horizontally yond the sides of the beam, disks moun to turn on the horizontal members of the s crank-shafts, locking devices for the cra shafts, brackets journaling the outer end the crank-shafts, and means for adjusta attaching the said brackets to the sides of beam, whereby to give the horizontal m bers of the shafts an inclination forwardl; rearwardly as required and as described.

In testimony whereof I have signed my n: to this specification in the presence of two s scribing witnesses.

DUNCAN GORDO^

Witnesses:
 LEE WELLS,
 CHAS. M. HUNSTALL.